SWITCHING DEVICE

Filed Jan. 23, 1958 2 Sheets-Sheet 1

INVENTOR
TEMPLE G. MARSHALL JR.
BY Louis A Kline
Albert L. Sessler, Jr.
HIS ATTORNEYS Aug. 29, 1961 T. G. MARSHALL, JR 2,998,530

SWITCHING DEVICE

Filed Jan. 23, 1958 2 Sheets-Sheet 2

INVENTOR
TEMPLE G. MARSHALL JR

BY Louis A Kline
Albert L. Sessler, Jr.
HIS ATTORNEYS

United States Patent Office 2,998,530

Patented Aug. 29, 1961

2,998,530

SWITCHING DEVICE

Temple Gibson Marshall, Jr., Dayton, Ohio, assignor to The National Cash Register Company, Dayton, Ohio, a corporation of Maryland Filed Jan. 23, 1958, Ser. No. 710,813

16 Claims. (Cl. 250—208)

This invention relates to switching devices, and more particularly to electro-optical switching devices.

The present invention finds many applications in logical circuitry, and especially in so-called "parallel" or "one-shot" logical systems, in which an operation, such as the addition of two or more quantities, for example, can be performed in one cycle time or pulse time, rather than requiring a number of cycle or pulse times. The potential speed which can be achieved through the use of this type of logical system is many times that which can be achieved by the use of serial logic, which requires a plurality of sequential operations. Individual components having a low switching speed may therefore be used in a parallel logical system without decreasing the system's speed excessively.

Generally speaking, the present invention pertains to circuit elements in which emissive materials, such as electroluminescent members, are coupled to detectors, such as photoconductive cells, or other types of conduction gates, in such manner that an electrical input signal applied to the electroluminescent member causes radiation, which radiation impinges on the photoconductive cell to change its operating characteristics. Electroluminescence is a well-known property of certain phosphors, which causes them to emit radiation when excited by a change in potential gradient across the phosphors. As is also well known, illumination of a photoconductive cell greatly affects the electrical internal resistance of such a cell. A cell which is dark has a very high resistance, while one which is illuminated has a relatively low resistance. Other components which are capable of changing certain physical or electrical characteristics upon exposure to a selected radiation, such as photodiodes, phototransistors, bolometers, etc., could also be used in the present invention.

Circuit elements may therefore be designed which cause a given input into one or more electroluminescent cells to produce various types of outputs from circuits containing photoconductive cells, according to the manner in which these photoconductive cells are utilized in said circuits. The various input circuits to the electroluminescent cells and the circuits which include the photoconductive cells may be completely isolated, if desired, the only coupling between the two being radiation from the electroluminescent cells which illuminates one or more selected or corresponding photoconductive cells.

In the novel circuit of the present invention, a matrix or array is provided comprising a plurality of optically-coupled electroluminescent elements and photoconductive cells. The electroluminescent elements are divided into groups, and a common input conductor is supplied for each group. Thus, a signal on this input conductor excites all of the electroluminescent elements coupled thereto, causing them to emit radiant energy according to their characteristics. Common input conductors are also provided for groups of the photoconductive cells, and these are arranged with respect to the electroluminescent elements so that each photoconductive cell is optically coupled to one or more corresponding electroluminescent elements. Signal output means are provided, and one such means is coupled to each photoconductive cell.

It will thus be seen that potential applied to an input conductor for any group of photoconductive cells will cause a potential drop across each of the photoconductive cells of that group, and that the amount of such drop will depend upon the resistance of the particular cell. Since the resistance of any cell may be altered by illuminating said cell by radiation from its corresponding electroluminescent element, an output signal at the output means of such cell can be provided by applying a signal to the conductor associated with the corresponding electroluminescent element or elements at the same time that potential is being applied to the input conductor associated with the photoconductive cell.

It will thus be seen that applying a signal to the input conductor of a group of electroluminescent elements will cause all of the elements in said group to emit radiant energy, and that applying a signal to the input conductor for a group of photoconductive cells will cause potential to be applied across each of the cells in that group. However, an output signal from the output means associated with a particular photoconductive cell will be achieved only in the case of the one cell across which a potential is applied by an input signal, and which at the same time is illuminated by one or more electroluminescent elements to which input signals are applied. The coincident application of input signals to selected conductors in the various groups will therefore result in an output signal at only one output means, and an output signal may be achieved from any output means by the proper selection of input conductors associated with the electroluminescent elements and the photoconductive elements.

A number of important advantages are realized by the novel switching device of the present invention. There is electrical independence of the electroluminescent and photoconductive inputs lines. An output signal may take any form, and is not restricted to A.C. or other voltages which are used for excitation of the electroluminescent cells. There are no intra-matrix "sneak" paths, and therefore no "partially selected" intersections and no spurious output signals. There is no contact chatter such as normally occurs when relay contacts are used in a switching device. Electroluminescent elements used in the present invention may be driven by any source or input providing a suitable voltage, since their driving circuitry does not contain photoconductive cells, which have a relatively high impedance at high frequency, when a plurality of the novel switching devices are used together to form logical networks. Much higher gain and speed are thus possible. Power requirements for the novel switching device are very modest, and no problem of heat dissipation arises from their use. A common ground may be provided for all of the electroluminescent cells in the matrix, which makes possible the construction of one or more matrices on a single electroluminescent plate or panel. The elements may be made by relatively simple and inexpensive manufacturing processes and therefore have a low ultimate cost. They are extremely compact in size, and large numbers may readily be used in various combinations.

Accordingly, an object of the invention is to provide an improved switching device.

Another object is to provide an efficient and inexpensive switching device which may be used in a wide variety of switching circuits.

An additional object is to provide an inexpensive switching device adaptable to mechanized fabrication methods such as printing, etching, silk-screening, vacuum depositing, and plating.

A further object is to provide an electro-optical switching device having optically-coupled elements to produce an output signal in response to certain predetermined combinations of input signals.

An additional object is to provide a switching device in which a first type of access or input line may be isolated from additional types of access or input lines.

Still a further object is to provide a switching device in which an output signal is produced at a given output means by the coincident application of input signals to a first conductor associated with a group of electroluminescent elements and to a second conductor associated with a group of photoconductive cells.

Still another object is to provide an inexpensive switching device having a mutually coextensive ground plane or conductor as a layer throughout the assembly.

Other objects of the invention will become apparent from the following description and claims and the accompanying drawings, which disclose, by way of example, a preferred embodiment of the invention.

Figures 1, 2:
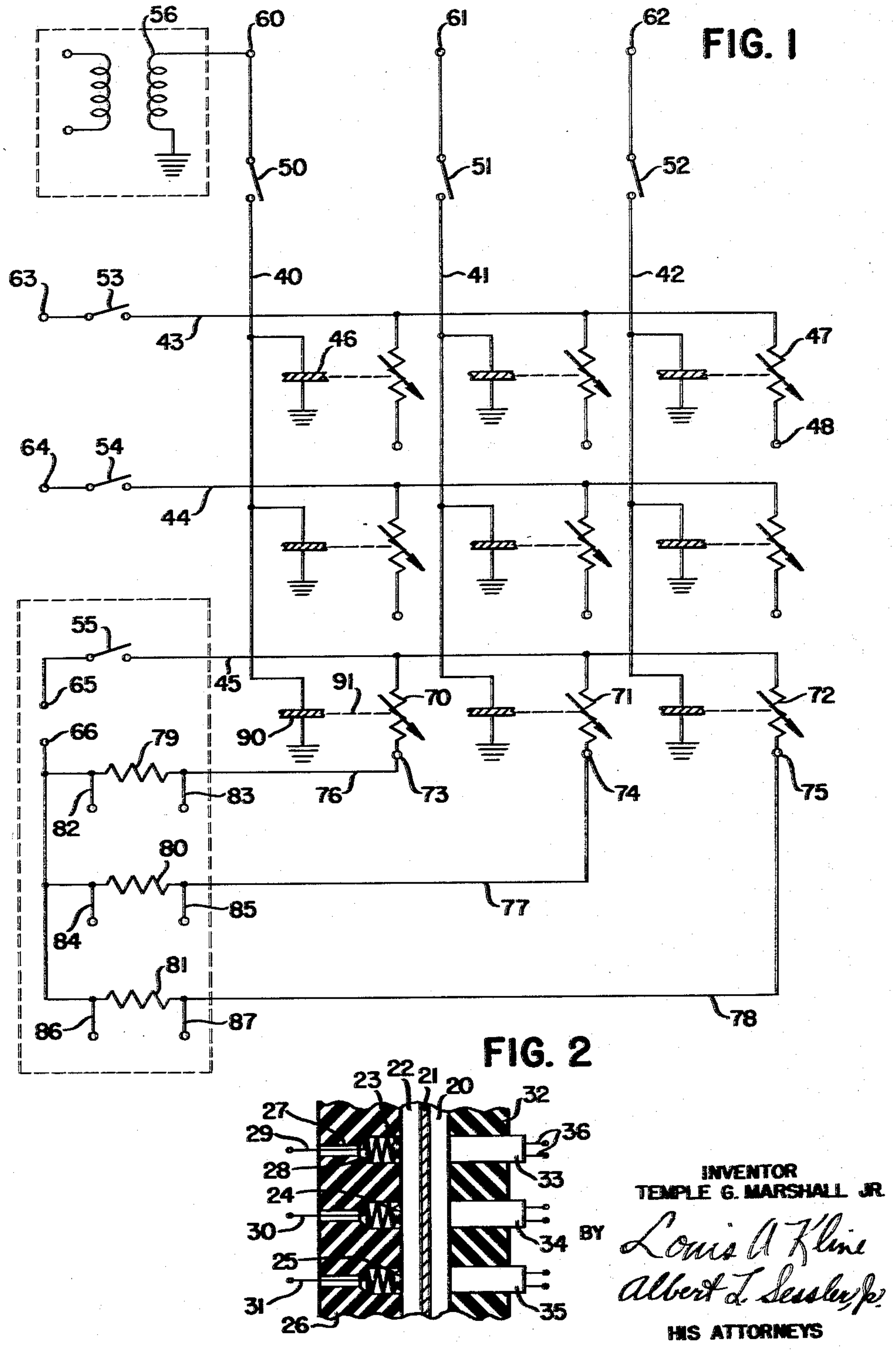
FIG. 1 is a diagrammatic view showing a circuit arrangement for the novel switching device of the present invention.
FIG. 2 is a sectional view showing one form of structure which the electro-optical elements used in the present invention may take.

Referring to FIG. 2, a component structure is shown in which a base 20 of transparent non-conducting material such as glass is provided. On one side of the base 20 is a layer 21 of transparent electrically conductive material to which a terminal (not shown) is attached for establishing an electrical circuit. This may act as an electrostatic shielding when used properly, and will reduce electrical cross-talk between input and output lines, especially where they operate at high impedance levels. While a transparent layer 21 is shown, it will be obvious that any other suitable material, such as a fine mesh screen, which will allow the desired radiation to pass therethrough, may be used.

Over the layer 21 is a layer or coating 22 of electroluminescent material, which may be of the zinc sulfide copper-halide-activated type of phosphor. If desired, this coating 22 may take the form of a transparent or translucent dielectric binder in which are imbedded multitudinous particles of an electroluminescent phosphor of the above type. Other suitable materials, such as vacuum-deposited or chemically-deposited phosphor layers, may be used if desired. A plurality of input terminals 23 to 25 inclusive are shown secured to the layer 24 of the electroluminescent material. The area of joinder of each of these terminals with the layer 22 in the instant embodiment is approximately ¼" in diameter and of circular configuration, and the current path through the phosphor layer in this area has been found to have an impedance of approximately ½ megohm, when the exciting voltage is at a frequency of 10,000 c.p.s. The coating 22 may be applied as a continuous layer, as shown, or may be applied as discrete areas corresponding to the input terminals, or as a mosaic of smaller discrete areas corresponding to the input terminals, or extending beyond, wherever it may be deemed advantageous.

An insulating form 26, of any suitable insulating material, is positioned adjacent the layer 22 of electroluminescent material. Bores 27 having enlarged countersunk portions 28 are provided in the form 26 in alinement with each of the terminals 23 to 25 inclusive. These bores receive conductors 29, 30, and 31, each having an enlarged spring-like portion which fits within the portion 28 of the bores 27, and is normally held in compression in such portions to provide a firm, reliable contact of the conductors 29, 30, and 31 with the terminals 23, 24, and 25. The block 26 may be held in engagement with the base 20 and its associated layers 21 and 22 by any suitable means. The outer ends of the conductors 29, 30, and 31 may be connected in an appropriate manner to form certain of the input means for the switching device of the present invention.

On the other side of the base 20 is positioned an additional block 32, which may be formed of any suitable material. The block 32 has bores therein positioned opposite the terminals 23, 24, and 25, to receive photoconductive cells 33, 34, and 35. Each of these cells may be composed of a photoconductive element such as at least one electroded crystal of properly doped cadmium sulfide or cadmium selenide, conveniently cased by potting in plastic material, as shown in FIG. 2. Also, if desired, the photoconductive elements may be in the form of a layer consisting of a polycrystalline film of cadmium sufide or some other photoconductive material. A pair of leads 36 extend from each of the photoconductive cells 33 to 35 inclusive. These leads may be connected to provide the required circuit arrangement for the present invention.

It will be realized that the structure shown in FIG. 2 comprises only a portion of the component which would be required for the matrix shown in FIG. 1, and that said component may be extended in either of two planar directions so far as is necessary to provide the required number of coupled pairs of electroluminescent elements and photoconductive cells. Any appropriate means of manufacture may be used to produce this component. The various layers could, if desired, be deposited, one on the other, overlapping, or adjacent by techniques such as by vacuum deposit means, or standard spray or printing techniques might be modified to produce such elements quickly and cheaply.

The manner in which the circuit component shown in FIG. 2 may be embodied in the novel switching device of the present invention will now be described. Certain representative values of voltage, frequency, wave shape, and impedance are given in this description. It should be realized that these values are merely illustrative and that the invention is in no wise limited by or restricted to them, since other appropriate values may be used where desired or necessary.

The novel switching device is diagrammatically shown in FIG. 1 as comprising a first group of input conductors 40, 41, and 42 and a second group of input conductors 43, 44, and 45. For the sake of convenience, the individual conductors of each group are shown forming coordinates in parallel relationship to each other; the conductors 40, 41, and 42 extending vertically in FIG. 1, while the conductors 43, 44, and 45 extend horizontally, and at right angles to the conductors 40, 41, and 42. Although the conductors of the two groups are shown as forming a plurality of intersections, they are not actually connected, and are electrically isolated from each other. It will of course be realized that no precise geometric arrangement of the conductors is essential to the proper operation of the switching device, and that any desired number of conductors may be included in each group.

Connected to each of the conductors 40, 41, and 42 are a plurality of electroluminescent elements 46 (in FIG. 1, three), the other side of each of which is connected to a base reference potential, which is ground potential in the showing of FIG. 1. Each of these elements 46 consists of one of the areas of the electroluminescent layer 22 (FIG. 2) opposite a terminal such as 23, 24, or 25.

Connected in parallel to each of the conductors 43, 44, and 45 are a plurality of photoconductive elements 47 (in FIG. 1, three), which are shown diagrammatically as variable resistances, since, as has been stated, the resistance of a photoconductive element varies according to whether or not said element is illuminated by radiation of the proper character. The other side of each of the photoconductive elements 47 is connected to an output terminal such as 48. The photoconductive elements shown diagrammatically at 47 in FIG. 1 correspond to the cells such as 33, 34, and 35 of FIG. 2. As shown in both FIGS. 1 and 2, the photoconductive elements 47 are positioned with respect to the electroluminescent elements 46 so that the two are paired, there being one photoconductive element 47 located adjacent each electroluminescent element 46. This arrangement provides an optical coupling between the elements 46 and 47, as will subsequently be described. Such a coupled pair is provided adjacent each intersection of the first group of input conductors, represented in FIG. 1 by the conductors 40, 41, and 42, with the second group of conductors, represented in FIG. 1 by the conductors 43, 44, and 45.

An output signal is provided at a selected output terminal, such as the terminal 48, by the selection of one conductor from each of the first and second groups of conductors, and the application of an input signal to each of said selected conductors. Any desired type of input signal may be applied to the selected conductors of the first and second groups, with the reservation that the input signal applied to the group of conductors represented in FIG. 1 by conductors 40, 41, and 42 must be of a character capable of exciting the particular material making up the electroluminescent elements 46 which are associated with the conductors 40, 41, and 42.

Any desired arrangement may be employed for supplying input signals to the conductors 40, 41, and 42 and to the conductors 43, 44, and 45, and, in order to explain the operation of the device, a diagrammatic arrangement for this purpose is shown in FIG. 1. This includes switches 50, 51, and 52 for the conductors 40, 41, and 42, and switches 53, 54, and 55 for the conductors 43, 44, and 45. It should be realized that the use of switches is merely illustrative, and that any means capable of producing a voltage change or pulse on the conductors may be used. Thus such means as circuits employing vacuum tubes, transistors, magnetic cores, relays, thyratrons, ferroelectric cells, photoconductive cells, or other suitable devices may be used, and different means may be used on different conductors of the same matrix. The conductors 40, 41, and 42 are connected over the switches 50, 51, and 52 to terminals 60, 61, and 62. These terminals are connected to one end of the secondary of the transformer 56, the other end of said secondary being connected to a base reference potential or ground. In the illustrated embodiment, a 10,000-cycle sinusoidal voltage of approximately 1,200 volts peak-to-peak is derived from the secondary of the transformer 56, although a number of other frequencies and voltages have been used successfully. These values are not intended to indicate any restriction as to the ranges of frequency and voltage.

The conductors 43, 44, and 45 are connected over the switches 53, 54, and 55 to terminals 63, 64, and 65. Any source of potential of any desired value, either A.C. or D.C., may be applied to these terminals. If desired, these terminals may be supplied from the transformer 56. However, for some uses it may be desirable to isolate electrically the group of conductors 40, 41, and 42 from the group of conductors 43, 44, and 45, and for such uses a potential source other than the transformer 56 can be employed. In the illustrated embodiment, a direct current potential supply of 45 volts was utilized, but this value is not intended to indicate any restriction as to the power supply for the conductors 43, 44, and 45.

A diagrammatic representation is shown in FIG. 1 in association with input conductor 45 of means for the production of output signals on a predetermined output conductor by means of selection of the proper input conductors from the two aforementioned groups of said conductors. This representation is, of course, purely illustrative, and any appropriate means may be connected to the output terminals of the switching matrix for utilization of the output signals. For example, it might be desired to connect the inputs of additional switching matrices to the output terminals of another matrix. It will be seen that associated with the input conductor 45 are three photoconductive cells 70, 71, and 72. Connected in series with the photoconductive cells 70 to 72 inclusive are terminals 73, 74, and 75, respectively, to which are attached output conductors 76, 77, and 78. The conductors 76, 77, and 78 are connected across load resistors 79, 80, and 81, respectively, to the terminal 66, which, it will be recalled, is one of the two terminals 65 and 66 across which any source of potential of any desired value may be applied to the input conductor 45 over the switch 55. The load resistors 79, 80, and 81 may be of any appropriate value, and a value of 10,000 ohms has been chosen in the present embodiment. Leads 82 and 83 connected to the ends of the load resistor 79 and corresponding leads 84 and 85 for the load resistor 80 and leads 86 and 87 for the load resistor 81 are provided to which any desired devices for receiving selected output signals from the switching matrix may be attached. It will be seen that an output circuit for developing output signals from the various output terminals associated with the conductors 43 and 44 may be provided for such conductors, but for the sake of simplicity in illustration and description, only the output signal circuit associated with conductor 45 is shown in FIG. 1.

A brief description will now be made of the manner in which the switching device of FIG. 1 operates. Let it be assumed that an output signal is desired from the terminal 73, said output signal to be measured across the leads 82 and 83. In order to accomplish this, input signals must be applied to the conductors 40 and 45 of the first and second groups, respectively. Such input signals must be applied in the diagrammatic circuit representation of FIG. 1 by closing of the switches 50 and 55 to apply electrical energy to the conductors 40 and 45, respectively. Closing of the switch 50 causes the current from the secondary of the transformer 56 to be applied over the input conductor 40 to the electroluminescent cells connected thereto to excite said cells. Cell 90 of this group is caused to emit radiation, a portion of which travels over the path 91 indicated in dashed lines in FIG. 1 and falls upon the photoconductive cell 70 to illuminate said cell. Illumination of the photoconductive cells used in this example of the present invention greatly alters their internal electrical resistance. In the circuit shown in FIG. 1, and with the given values of voltage and frequency applied to the electroluminescent cell 90, the resistance of the photoconductive cells, such as cell 70, varies from approximately 10,000 ohms per cell, when it is illuminated by radiation from the electroluminescent element 90 over the path 91, to over 10,000 megohms per cell when it is dark. The ratio of resistance is thus on the order of 1 to 1,000,000. It has been found that, by increasing the frequency of the potential applied across the electroluminescent elements, their light output may be greatly increased. The relatively high frequency employed in the present embodiment therefore provides a high ratio of resistances between the light and the dark states of the photoconductive cells. This makes possible a higher switching speed, greater reliability, and the use of smaller elements.

At the same time that an input signal is applied over the conductor 40 to the electroluminescent element 90, as by closing the switch 50, an input signal is applied over the conductor 45 to the parallel connected photoconductive cells 70, 71, and 72, as by closing of the switch 55. Since the cell 70 is illuminated, while the cells 71 and 72 are dark, the resistance of the cell 70 will be very small in comparison to the resistances of the cells 71 and 72, and consequently the voltage drop across the cell 70 will be much less than the voltage drops across the cells 71 and 72, and the current through the latter two cells will be extremely small. Due to this fact, the voltage drop across the resistance 79, which is in series with the cell 70, will be much greater than the voltage drop across the resistance 80, which is in series with the cell 71, and will be also much greater than the voltage drop across the resistance 81, which is in series with the cell 72. Hence the difference between the potential at lead 82 and the potential at lead 83 will be much greater at the time of application of input signals to the conductors 40 and 45 than the difference between the potential at lead 84 and that at lead 85, and will also be much greater than the difference in potential between that at lead 86 and that at lead 87. An output signal is thus clearly defined on the output circuit from the terminal 73 when input signals are applied simultaneously to conductors 40 and 45.

Similarly, an output signal may be produced at any one of the output terminals of the switching device by selection of the proper combination of input conductors and simultaneous application of input signals thereto. For example, an output signal will be produced at the output terminal 48 by application of simultaneous input signals to the conductors 42 and 43. In the same manner, an output signal may be produced on any of the other output terminals of the switching device.

Figure 3:
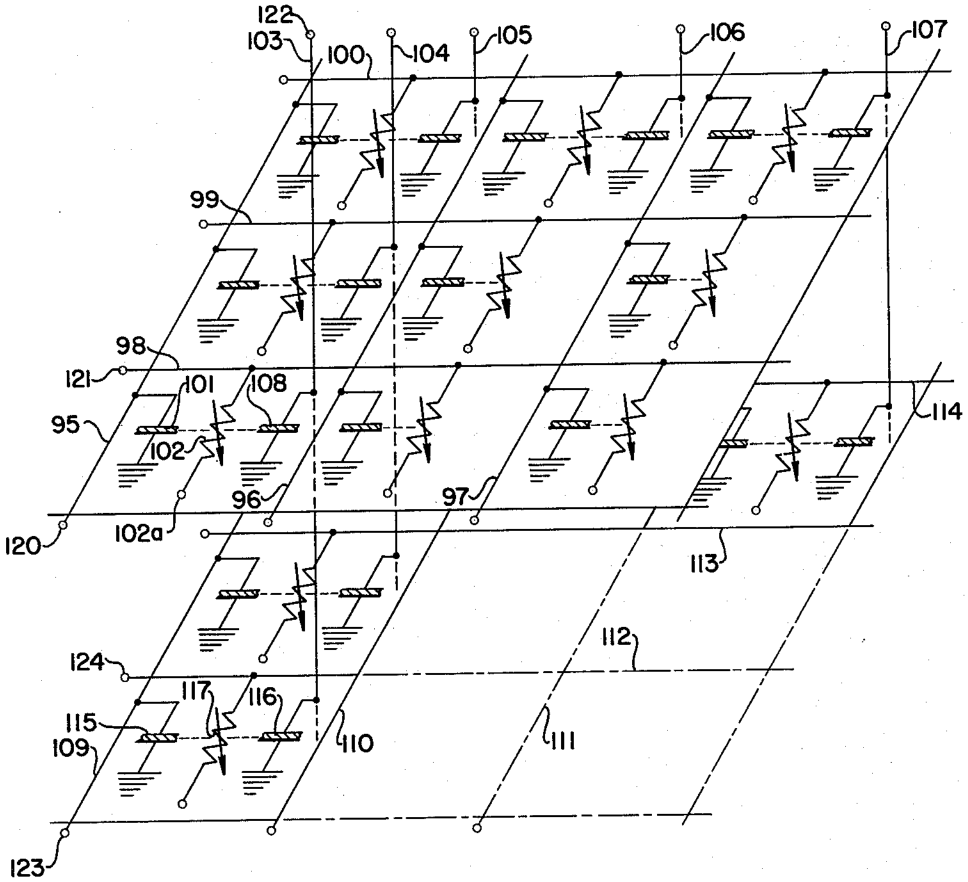
FIG. 3 is a view showing a three-dimensional form of the novel switching device.

Many different types of switching devices using the optical coupling principle may be developed according to the requirements of particular applications. In FIG. 3, a switching device having three sets or groups of input conductors and comprising a plurality of planes containing the optical coupling elements is shown. A first group of input conductors 95, 36, and 97, and a second group of input conductors 98, 99, and 100 have connected thereto, respectively, a plurality of electroluminescent elements such as 101, connected at their other side to ground, and a plurality of photoconductive cells such as 102, each photoconductive cell being associated with an electroluminescent element in the same manner as shown in FIG. 1. An output terminal such as 102*a* is associated with each photoconductive cell. Also, in FIG. 3, a third group of input conductors 103, 104, 105, 106, and 107 is provided, each conductor having connected thereto an electroluminescent element such as 108 which is associated with one of the photoconductive cells and electroluminescent elements of the first and second group of input conductors. As shown in FIG. 3, the conductors 103 to 107 inclusive extend through the plane defined by input conductors 95 to 97 inclusive, and 98 to 100 inclusive, and intersect a further plane defined by a first group of input conductors 109, 110, and 111, and a second group of input conductors 112, 113, and 114. In this second plane, additional optically coupled groups of electroluminescent elements and photoconductive cells are provided, such as the electroluminescent elements 115 and 116 and the photoconductive cell 117 associated with the input conductors 109, 112, and 103, respectively. The various input conductors of the switching device of FIG. 3 may be provided, if desired, with input terminals such as 120, 121, 122, 123, and 124, for the first, second, and third groups of input conductors for the first plane, and the first and second group of input conductors for the second plane, respectively.

It will be noted in FIG. 3 that the third group of input conductors is not associated with all of the intersections of the first and second group of conductors, and that some intersections therefore have only a single electroluminescent element in optically-coupled relationship with a photoconductive cell, rather than having two electroluminescent cells optically coupled to a single photoconductive cell, as is the case with the electroluminescent elements 101 and 108 and the photoconductive cell 102. This illustrates the fact that in a three-dimensional switching matrix of the type shown in FIG. 3, it is not required that three input conductors be provided for each and every output means, and that, if desired, some of the output means may be associated with only two input conductors. Also, it should be noted that while only two planes are shown in FIG. 3, intersected by a total of five input conductors of the third group, any desired number of planes may be employed, together with any desired number of input conductors of the third group for intersecting said planes, according to the total number of output means desired, and the number of input conductors desired for each output means.

The physical construction of the switching matrix of FIG. 3 may consist of a number of component structures similar to that shown in FIG. 2, stacked one upon the other, or it may consist of any other desired physical arrangement in which the various electroluminescent elements and photoconductive cells are arranged in proper predetermined optical relation to each other, and are provided with input conductors and output means according to the requirements of the particular application in which they are to be used.

A brief description will now be made of the manner in which the switching device shown in FIG. 3 operates. Input signals may be applied to the input terminals of the various input conductors of the switching device in any desired manner, such as has been described in connection with the description of the switching device of FIG. 1. Similarly, an output signal from any of the output terminals of the device of FIG. 3 may be taken from any of the output terminals according to the combination of input signals applied, and may be measured in any desired manner, one such manner having been disclosed in connection with the description of the switching device of FIG. 1.

Let it then be assumed that an output signal is desired from the terminal 102*a*. In order to accomplish this, input signals must be applied to the conductor 98 and to one of the conductors 95 or 103. Since both of the electroluminescent elements 101 and 108 are in optically-coupled relation to the photoconductive cell 102, radiation from either of the elements 101 or 108 falling upon the cell 102 will be sufficient to alter the resistance of the cell 102 so as to produce an output signal on the terminal 102*a* when an input signal is coincidentally applied at the terminal 121 of the input conductor 98.

It will be seen, therefore, that this arrangement provides a type of "OR" gate, since a signal applied to the terminal 121 in combination with a signal applied at either the terminal 120 or the terminal 122 will cause an output signal to be produced on the output terminal 102*a*. Similarly, an output signal may be produced at the output terminal associated with any photoconductive cell having two electroluminescent elements in optically-coupled relation thereto by the combination of an input signal on the input conductor associated with said photoconductive cell, together with an input signal on either of the two conductors associated with the electroluminescent elements which are in optically-coupled relation to said photoconductive cell.

If desired, this combination of two electroluminescent elements and a photoconductive cell in optically-coupled relation thereto could be utilized to provide a coincidence gate in which input signals to all three of the input conductors involved would be necessary. Such a result would be attained by utilizing electroluminescent elements and photoconductive cells having such physical characteristics that the combined illumination or radiation of the two electroluminescent elements would be necessary to change the resistance of a preferably non-linear photoconductive cell sufficiently to provide an output signal of at least a predetermined strength at its associated output terminal.

As has been stated above, certain portions of the switching matrix of FIG. 3 are provided with only two sets of intersecting input conductors, and in these areas the electroluminescent elements associated with one set of input conductors and the photoconductive cells associated with the other set of input conductors form coincidence switching units of the type shown in FIG. 1. It will thus be seen that a switching matrix of the type shown in FIG. 3 may embody different types of individual switching units for different purposes for increased versatility.

Figure 4:
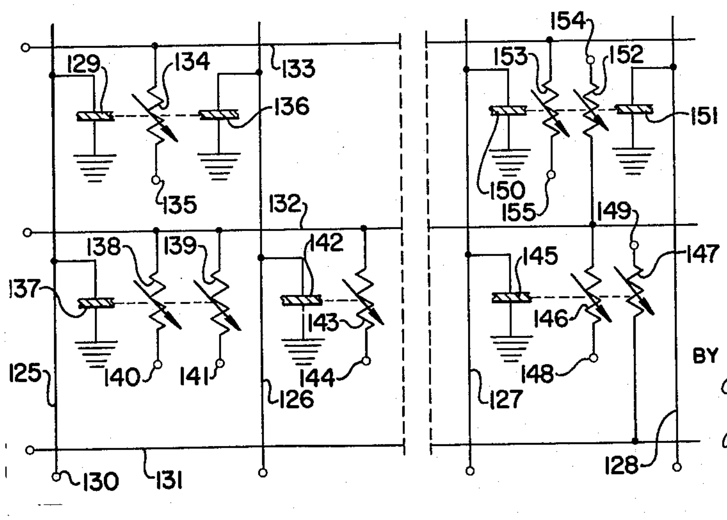
FIG. 4 is a diagrammatic view showing several different combinations of electro-optical elements used in a switching matrix.

Another embodiment of the novel switching device of this invention is shown in FIG. 4. In this embodiment, a number of different combinations of electroluminescent elements and photoconductive cells are shown arranged in a two-dimensional form. A first group of input conductors 125, 126, 127, and 128 are provided for supplying input signals to a plurality of electroluminescent elements, such as the element 129, certain of said elements being connected to each of the input conductors 125 to 128, inclusive, each electroluminescent element being connected at its other side to ground. Each of said input conductors may be provided with an input terminal such as the terminal 130. A second group of input conductors 131, 132, and 133 is provided for supplying input signals to a plurality of photoconductive cells such as 134, certain of said cells being connected to each of the conductors 131 to 133, inclusive. As was the case in the previously-described embodiments of the invention, an output terminal such as 135 is associated with each of the photoconductive cells and provides a means by which output signals may conveniently be taken off the switching device.

Several different combinations of photoconductive cells and electroluminescent elements are shown in FIG. 4. In the upper left portion of FIG. 4, the electroluminescent element 129 connected to the input conductor 125 is associated with the photoconductive cell 134 connected to the input conductor 133 and is also associated with a further electroluminescent element 136 connected to the input conductor 126. It will be seen that in this combination an input signal on the conductor 133, in combination with a simultaneous input signal on either of the conductors 125 or 126, will produce an output signal on the terminal 135, in a manner similar to that described in connection with the optically-coupled units 101, 102, and 108 of FIG. 3. Here, as in the arrangement of FIG. 3, the electroluminescent elements 129 and 136 and the photoconductive cell 134 could be made from materials having physical characteristics such that the combined radiation from both of the elements 129 and 136 would be required to decrease the resistance of the cell 134 to the extent sufficient to produce an output signal on the terminal 135, in which case simultaneous input signals on the input conductors 125, 126, and 133 would be required to produce an output signal on the terminal 135.

Another arrangement is shown in the lower left portion of FIG. 4, where an electroluminescent element 137 connected to the input conductor 125 is optically coupled to two photoconductive cells 138 and 139, both of which are connected to the input conductor 132, and which have output terminals 140 and 141, respectively, associated therewith. It will be seen that with this arrangement, simultaneous input signals on the conductors 125 and 132 will produce simultaneous output signals on the terminals 140 and 141, since both of the photoconductive cells 138 and 139 will be illuminated simultaneously by radiation from the electroluminescent element 137 when said element is excited by a signal thereacross.

In the lower central portion of FIG. 4, an electroluminescent element 142 is connected to the input conductor 126 and is optically coupled to a photoconductive cell 143 connected to the input conductor 132 and having an output terminal 144 associated therewith. This arrangement, it will be recognized, is identical to that shown in FIG. 1, so that simultaneous input signals on the conductors 126 and 132 will produce an output signal on the terminal 144.

In the lower right-hand portion of FIG. 4, an electroluminescent element 145 is shown connected to the input conductor 127 and optically coupled to two photoconductive cells 146 and 147 having output terminals 148 and 149, respectively, associated therewith. The photoconductive cell 147 is connected to the input conductor 131, while the photoconductive cell 146 is connected to the input conductor 132. With this arrangement, whenever an input signal is applied to the conductor 127, the electroluminescent element 145 will be excited and will emit radiation to illuminate both of the photoconductive cells 146 and 147 to lower the resistance thereof. If an input signal is applied simultaneously to either or both of the conductors 131 or 132, output signals will appear on either or both of the terminals 148 or 149 corresponding to the conductors on which signals are applied.

Finally, in the upper right-hand portion of FIG. 4, an arrangement is shown which utilizes two electroluminescent elements and two photoconductive cells. Electroluminescent elements 150 and 151 are connected to input signal conductors 127 and 128, respectively, and photoconductive cells 152 and 153 are connected to input conductors 132 and 133, respectively. Output terminals 154 and 155 are associated with the photoconductive cells 152 and 153, respectively. With this arrangement, either of the two electroluminescent elements 150 or 151 may be utilized to illuminate both of the photoconductive cells 152 and 153. Therefore, by simultaneous application of an input signal to one of the two input conductors 127 and 128, and simultaneous application of an input signal to one of the two conductors 132 and 133, it is possible to produce an output signal at one of the two output terminals 154 and 155, depending upon which of the input conductors 132 and 133 is chosen to receive an input signal. Similarly, if coincident input signals are applied to the conductors 132, 133 and one of the two conductors 127 or 128, output signals will appear at both of the terminals 154 and 155. It will be seen that it is a matter of indifference as to which of the two input conductors 127 or 128 a signal is applied in this instance, since either of the electroluminescent elements 150 or 151 will illuminate both of the photoconductive cells 152 and 153. Here again, if desired, the material of the electroluminescent elements 150 and 151 and of the photoconductive cells 152 and 153 could be so chosen that the combined illumination of both of the elements 150 and 151 would be required to lower the resistance of the cells 152 and 153 sufficiently to produce the desired output signals at their corresponding terminals when input signals were applied to either or both of the conductors 132 and 133. Also, if desired, one of the photoconductive cells 152 and 153 could be of such material that its resistance would be sufficiently lowered to produce an output signal at its corresponding terminal by the illumination of only one of the elements 150 and 151, while the other of the two photoconductive cells was of a material which required the emission of radiant energy from both of said elements 150 and 151 in combination to reduce its resistance sufficiently to permit an output signal to appear at its corresponding output terminal.

It will be noted in FIG. 4 that several of the various input conductors are associated either with several electroluminescent elements or with several photoconductive cells. Due to this fact, it is possible to achieve input signal combinations which will produce an output signal in addition to those described above. For example, it will be seen that photoconductive cells 138, 139, 143, 146, and 152 are all connected to the input conductor 132. Therefore, by selecting the input conductor 132 as one of the conductors to which an input signal is to be applied, a number of posibilities exist as to which output terminal may be selected for the appearance of an output signal. If the conductor 125 is chosen to receive a simultaneous input signal, output signals will appear on terminals 140 and 141. If the input conductor 126 is chosen to receive a simultaneous input signal, an output signal will appear on the terminal 144. Choice of the input conductor 127 for an input signal simultaneous with the application of a signal on conductor 132 will result in output signals appearing simultaneously on terminals 148 and 154, while the choice of input conductor 128 for application of an input signal simultaneously with application of such a signal on conductor 132 will also result in an output signal appearing on terminal 154, but will not result in an output signal appearing on the terminal 148.

The showing of FIG. 4 is therefore somewhat illustrative of the large number of possible combinations of inputs which may be employed to produce output signals at different terminals in a relatively small matrix using the principles of the present invention. FIG. 4 is also illustrative of the fact that a matrix may and often will be constructed having several different combinations of electroluminescent elements and photoconductive cells therein, optically coupled in different relationships. The physical construction of a matrix or switching device such as shown in FIG. 4 may take the general form of FIG. 2, in which the electroluminescent elements and photoconductive cells are built up in a single fabricated component, or, if desired, the physical construction may utilize individual electroluminescent elements and photoconductive cells placed in the proper relationship and associated with input conductors and output terminals to provide the desired results. In the device of FIG. 4, as well as in the embodiments shown in FIG. 1 and FIG. 3, a fabricated component embodying an entire device or matrix in a single unit would appear to have a number of advantages, as has been previously discussed in the specification.

An additional factor which may be introduced into the switching matrices or devices shown in FIGS. 1, 3, and 4 to provide still further variations of input signals in desired combination for the production of output signals at predetermined points is that of relative phase of the input signals applied to the various conductors. It will be seen that in order for an output signal to be produced at one of the output terminals which is associated with a corresponding photoconductive cell, a signal must be applied to the conductor associated with the cell at the same time that the cell is in a state of relatively low resistance as a result of being illuminated by radiation emitted from an electroluminescent or radiation-emissive element optically coupled thereto. Therefore, if a further means is added to the switching device of the present invention to control adjustment of phase or timing of the various signals applied to the various input conductors, a further dimension of coincidence control is added to the requirements for the application of signals on the input conductors of two or more optically-coupled units to product an output signal. For example, if it is desired to produce an output signal at the output terminal 74 of FIG. 1, then not only must the switches 51 and 55 be closed, representing the application of coincident input signals to the conductors 41 and 45, but these signals must also be in the proper phase relationship, so that the signal on the conductor 45 is produced at the time that the photoconductive cell 71 is in an illuminated, low-resistance state, due to the emission of radiation from its corresponding electroluminescent element associated with the conductor 41. This lends still another dimension to the potentialities of the present invention.

It will thus be seen that the present invention provide a simple but effective switching device having a plurality of input means, each group containing any desired number of input conductors. Electrical isolation and shielding between the groups may be maintained, with the only coupling between them being of an optical nature. Any desired combination of one input conductor in one of the groups with one input conductor in one or more of the other groups may be utilized to provide an output signal, according to any desired predetermined arrangement or program. Since the elements of the present invention are small, compact, and easily and inexpensively manufactured, and have very small power requirements, they are ideally suited to uses, such as in computing devices, in which a large number of switching matrices and logical circuits are necessary. A large number of the switching devices of the present invention may be coupled together so that an output of one will serve as an input for the next, and so on. Combining of two or more of the switching devices is particularly advantageous when the outputs from the device are coupled to those inputs on additional devices which are associated with the photoconductive elements of the additional devices, since by this means paths are provided simultaneously through a plurality of the devices by simultaneous operation of selected lines related to electroluminescent elements in the various devices. Also no impedance matching problems arise when the photoconductive cells of the various devices are coupled thusly, as occurs when photoconductive cells and electroluminescent elements are associated in the same path. This type of arrangement is particularly useful in logical circuits for computing devices and lends itself well to inexpensive component fabrication techniques.

While the forms of the invention shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. A switching device comprising a first set of signal input conductors; a second set of signal input conductors electrically isolated from said first set and arranged with respect to the first set to provide a plurality of intersections between the two sets; a plurality of electroluminescent elements associated with each of the input conductors of the first set and capable of changing their emission of radiant energy in response to excitation by signals appearing on the conductor with which they are associated, each of said electroluminescent elements being related to one of said intersections; a plurality of photoconductive cells associated with each one of the second set of signal input conductors, each of said cells being also related to one of the intersections and in optically-coupled, electrically isolated relationship with one of the electroluminescent elements associated with the conductors of said first set, each of said cells being capable of changing its internal resistance in response to a change in the emission of radiant energy of the element to which it is optically coupled; output means coupled to each photoconductive cell; and means for applying coincident electrical signals to selected ones of the first and second set of signal input conductors to provide an electrical signal on one of the output means, the electrical signal on the selected conductor of the first set of conductors causing a change in emission of radiant energy of all of the elements coupled to said conductor, and the electrical signal on the selected conductor in the second set being applied to all of the photoconductive cells coupled to that conductor, the electrical output signal at the selected output means being produced in consequence of the changed resistance of the corresponding photoconductive cell.

2. A switching matrix comprising a first coordinate set of signal input conductors; a plurality of electroluminescent elements coupled to each of the conductors of the first set and capable of changing their emission of radiant energy in response to signals appearing on the conductor to which they are coupled; a second coordinate set of signal input conductors electrically isolated from said first set; a plurality of photoconductive cells connected in parallel to each one of the second coordinate set of signal input conductors, each of said cells being arranged in optically-coupled, electrically isolated relationship with one of the electroluminescent elements on the conductors of said first coordinate set, each of said cells being capable of changing its internal resistance in response to a change in the emission of radiant energy of the element to which it is optically coupled; output means coupled to each photo conductive cell; and means for applying coincident electrical signals to selected ones of the first and second coordinate sets of signal input conductors to produce an electrical signal on one of the output means, electrical signal on the selected conductor of the first coordinate set causing a change in emission of radiant energy of all of the elements coupled to said conductor to change the resistance of only the corresponding optically-coupled ones of the photoconductive cells connected to the various conductors of the second coordinate set, and the electrical signal on the selected conductor in the second coordinate set being applied to all of the photoconductive cells coupled to that conductor, the electrical output signal at the selected output means being produced in consequence of the changed resistance of the corresponding photoconductive cell.

3. A switching device comprising a first set of signal input conductors; a plurality of electroluminescent elements coupled to each of the conductors of the first set and capable of changing their emission of radiant energy in response to signals appearing on the conductor to which they are coupled; a second set of signal input conductors; a plurality of photoconductive cells coupled to each one of the second set of signal input conductors, each of said cells being arranged in optically-coupled, electrically isolated relationship with one of the electroluminescent elements coupled to the conductors of said first set, each of said cells being capable of changing its internal resistance in response to a change in the emission of radiant energy of the element to which it is optically coupled; output means coupled to each photoconductive cell; and means for applying coincident electrical signals to selected ones of the first and second sets of signal input conductors to produce a signal on one of the output means, the electrical signal on the selected conductor of the first set causing a change in emission of radiant energy of all of the elements coupled to said conductor to change the resistance of the corresponding optically-coupled photoconductive cells, and the electrical signal on the selected conductor in the second set being applied to all of the photoconductive cells coupled to that conductor, the output signal at the selected output means being produced in consequence of the changed resistance of the corresponding photoconductive cell.

4. A switching matrix comprising a first set of signal input means; a second set of signal input means arranged with respect to the first set to provide a plurality of intersections between the two sets; a plurality of conduction gates associated with each of the signal input means of the first set and capable of changing their condition from a high-conduction state to a low-conduction state and vice versa, each of said gates being related to one of said intersections; a signal output means associated with each conduction gate, on which an output signal may appear when the corresponding conduction gate is in a high-conduction state and an electrical signal is applied to the associated signal input means; and a plurality of electro-optical control means associated with each of the signal input means of the second set, each of said electro-optical control means being arranged in optically-coupled, electrically isolated relation to one of the conduction gates and being controlled by electrical signals on the signal input means with which it is associated and being capable of changing the condition of the conduction gates, one electro-optical control means being provided for each conduction gate, so that coincident electrical signals on selected ones of the first and second signal input means will produce an output signal at a predetermined one of the output means.

5. A switching matrix comprising a first coordinate set of signal input means; a plurality of conduction gates connected in parallel to each of the signal input means of the first coordinate set and capable of changing their condition from a high-impedance state to a low-impedance state and vice versa; a signal output means associated with each conduction gate, on which an output signal may appear when the corresponding conduction gate is in a low-impedance state and an electrical signal is applied to the associated signal input means; a second coordinate set of signal input means; and a plurality of electro-optical control means associated with each of the signal input means of the second coordinate set, said electro-optical control means being controlled by electrical signals on the signal input means with which they are associated and being capable of changing the state of the conduction gates, one electro-optical coupling means being provided for each conduction gate in electrically isolated relationship, so that coincident electrical signals on selected ones of the first and second coordinate sets of signal input means will produce an output signal at a predetermined one of the output means.

6. A switching device comprising a first set of signal input means; a plurality of conduction gates associated with each of the signal input means of the first set and capable of changing their condition from a high-conduction state to a low-conduction state and vice versa; a signal output means associated with each conduction gate, on which an output signal may appear when the corresponding conduction gate is in conducting condition and an electrical signal is applied to the associated signal input means; a second set of signal input means; and a plurality of electro-optical control means associated with each of the signal input means of the second set, said electro-optical control means being controlled by electrical signals on the signal input means with which they are associated and being capable of changing the state of the conduction gates, one electro-optical control means being provided for each conduction gate in electrically isolated relationship, so that coincident electrical signals on selected ones of the first and second sets of signal input means will produce an output signal at a predetermined one of the output means.

7. A switching device comprising a first group of individual input means; radiation-emitting means associated with the individual input means of said first group; a second group of individual input means; radiation-sensitive signal control means associated with the individual input means of said second group; and a plurality of output means, each cooperating with combinations of the radiation-emitting means and the radiation-sensitive signal control means in radiation-coupled, electrically isolated relationship so that the provision of electrical input signals at selected individual input means of the first and second groups is effective to produce an output signal at a predetermined output means.

8. A switching device comprising a first group of individual input means; a second group of individual input means electrically isolated from the first group; a plurality of output means equal in number to the product of the number of input means in the two groups; and individual electro-optical means associated with each output means and coupling predetermined ones of the input means of the first and second groups and capable of causing an output signal to be produced at a predetermined output means in response to coincident electrical input signals at selected individual input means of the first and second groups.

9. A switching device comprising a first group of individual input means; a second group of individual input mean electrically isolated from said first group; a plurality of output means equal in number to the product of the number of input means in the two groups; and individual electro-optical means associated with each output means and coupling predetermined ones of the input means of the first and second groups and capable of causing an output signal to be produced at a predetermined output means in response to coincident electrical input signals at selected individual input means of the first and second groups.

10. A switching device comprising a first group of individual input means; a second group of individual input means arranged with respect to the first group to provide a plurality of intersections between the two groups, and electrically isolated from said first group; separate output means associated with each intersection; and electro-optical means associated with each output means and coupling predetermined ones of the input means of the first and second groups and capable of causing an output signal to be produced at a predetermined output means in response to coincident electrical input signals at selected individual input means of the first and second groups.

11. A switching device comprising a first group of individual input means; a second group of individual input means electrically isolated from said first group; a plurality of output means; and electro-optical means associated with each output means and coupling predetermined ones of the input means of the first and second groups and capable of causing an output signal to be produced at a predetermined output means in response to coincident electrical input signals at selected individual input means of the first and second groups.

12. A switching device comprising a plurality of electrically isolated groups of individual input means; a plurality of output means; and electro-optical means associated with each output means and coupling predetermined ones of the input means of various groups and capable of causing an output signal to be produced at a predetermined output means in response to coincident electical input signals at selected individual input means of said various groups.

13. A switching device comprising a plurality of groups of individual input means; a plurality of output means; and electro-optical means, including cooperating electrically isolated electroluminescent elements and photoconductive cells, associated with each output means and coupling predetermined ones of the input means of various groups and capable of causing an output signal to be produced at a predetermined output means in response to coincident electrical input signals at selected individual input means of said various groups.

14. A switching device comprising a plurality of groups of individual input means; electroluminescent elements associated with certain of said groups; photoconductive cells associated with certain others of said groups; and a plurality of output means, each cooperating with combinations of the electroluminescent elements and the photoconductive cells in optically-coupled, electrically isolated relationship so that the coincidence of electrical input signals at selected individual input means of the various groups is effective to produce an output signal at a predetermined output means.

15. A switching device comprising a plurality of groups of individual input means, said groups being arranged to provide a plurality of intersections of the individual input means of the various groups; electroluminescent elements associated with certain of said groups; photoconductive cells associated with certain others of said groups; and separate output means associated with each intersection, and cooperating with combinations of the electroluminescent elements and the photoconductive cells which are in optically-coupled, electrically isolated relationship, so that the coincidence of electrical input signals at selected individual input means of the various groups is effective to produce an output signal at a predetermined output means.

16. A switching device comprising a plurality of groups of individual input means; radiation-emitting means associated with certain of said groups; radiation-sensitive signal control means associated with certain others of said groups; and a plurality of output means, each cooperating with combinations of the radiation-emitting means and the radiation-sensitive signal control means in radiation-coupled, electrically isolated relationship so that the provision of electrical input signals at selected individual input means of the various groups is effective to produce an output signal at a predetermined output means.

References Cited in the file of this patent

UNITED STATES PATENTS

| | | |
|---|---|---|
| 2,900,522 | Reis | Aug. 18, 1959 |
| 2,907,001 | Loebner | Sept. 29, 1959 |

OTHER REFERENCES

Review of Scientific Instruments, vol. 24, June 1953, pp. 471–472.

Mellon Institute of Industrial Research, Quarterly Report No. 3, Second Series of The Computer Components Fellowship, No. 347, Apr. 1, 1954.